Sept. 28, 1926.

W. E. LYMAN 1,601,635

DEVICE FOR WIRING BEEHIVE FRAMES

Filed June 18, 1925  2 Sheets-Sheet 1

Inventor
William E. Lyman

By E. K. Bond
Attorney

Sept. 28, 1926.
W. E. LYMAN
1,601,635
DEVICE FOR WIRING BEEHIVE FRAMES
Filed June 18, 1925    2 Sheets-Sheet 2
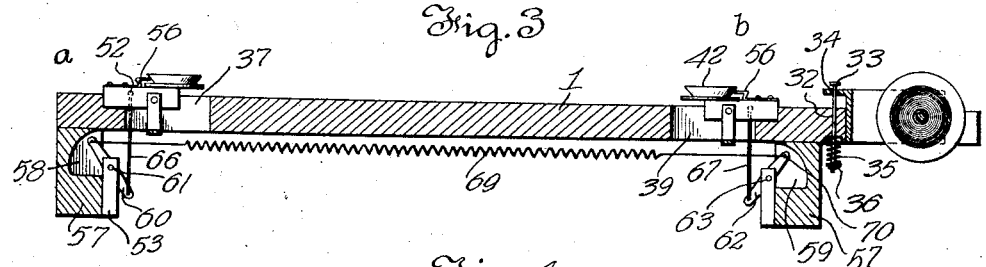
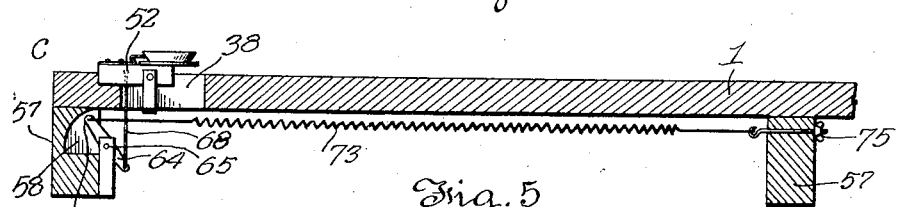
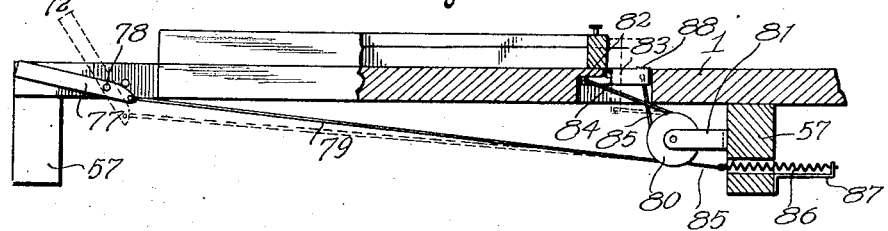
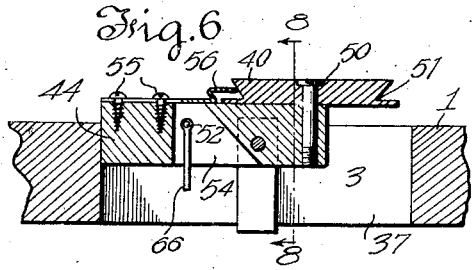
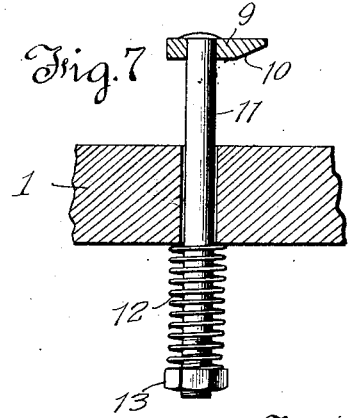
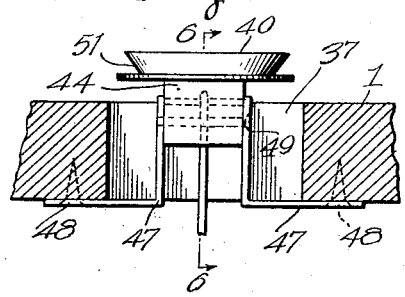
Inventor
William E. Lyman
By E. H. Bond
Attorney Patented Sept. 28, 1926.

1,601,635

UNITED STATES PATENT OFFICE.

WILLIAM E. LYMAN, OF WESTHAMPTON, MASSACHUSETTS.

DEVICE FOR WIRING BEEHIVE FRAMES.

Application filed June 18, 1925. Serial No. 37,978.

This invention relates to certain new and useful improvements in devices for wiring bee-hive frames, and it has for its object among others, to provide a simplified, reliable and efficient, yet durable device for this purpose, in which the tightening of the wires is done primarily by the device itself, the operator having simply to turn a spring-connected crank and spool and thus cause the three (more or less) spring-regulated wheels, practically with a simultaneous movement, to themselves automatically release the wire and allow it to be instantly pulled taut by a spring. The strain on the wire is thus previously ascertained, instead of being separately watched and calculated for every wire of every frame by the operator. The tightening is quick without practice, simple, easy, uniform and reliable. At the same time the cost of the device is not greatly increased.

The invention has for a further object to provide a simple pincher attachment which serves to pinch or squeeze the last-tightened wire against the side of the frame and hold it taut and tight so that the operator can easily and quickly, without cutting his fingers or using pliers, twist the said wire around the tack to hold it in its tightened condition.

Other objects and advantages of the invention will hereinafter appear and the novel features thereof will be specifically defined by the appended claims.

The invention, in its preferred form, is clearly illustrated in the accompanying drawings, in which, Fig. 1 is a top plan view of my improved device with the bee-hive frame in position, and with the keeper and pincher attachments.

Fig. 3 is an enlarged section as on the line 3—3 of Fig. 1, looking in the direction of the arrows.

Fig. 4 is an enlarged section on the line 4—4 of Fig. 1, looking in the direction of the arrows.

Fig. 5 is an enlarged section on the line 5—5 of Fig. 1, looking in the direction of the arrows, showing the pincher attachment.

Fig. 6 is an enlarged section on the line 6—6 of Fig. 8 looking in the direction of the arrows.

Fig. 7 is a vertical section through the line 7—7 of Fig. 1, and

Fig. 8 is an enlarged vertical section on the line 8—8 of Fig. 6.

Like numerals of reference indicate like parts throughout the several views.

Figures 1, 2:
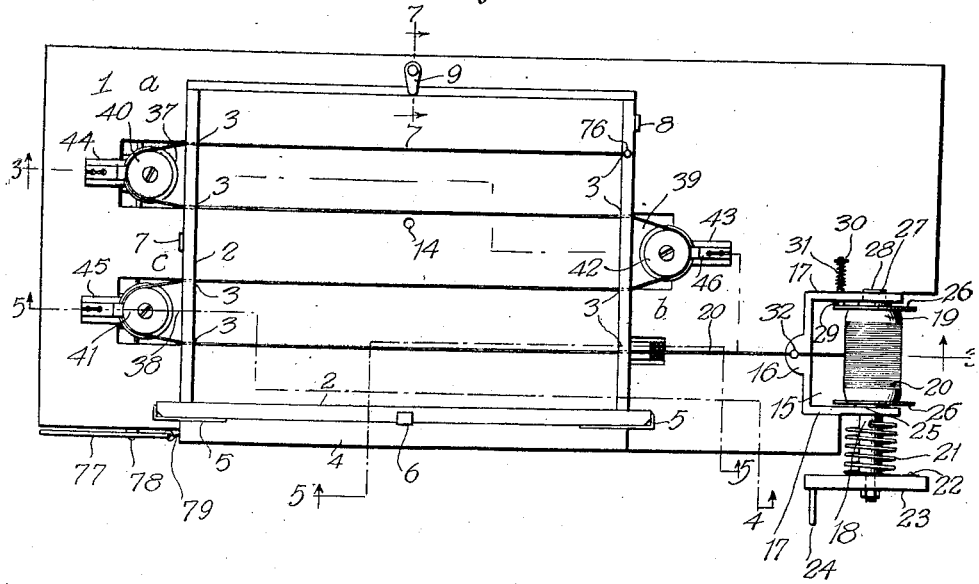
Fig. 2 is a bottom plan view.

Practically every modern bee-hive body and shallow super has within itself from eight to thirteen frames, which have four or two wires each, as the case may be, running lengthwise of the frame. The function of these wires is to assist in holding the wax pattern or foundation in place during cell building, and to strengthen the fragile comb after it is built by the bees, so that there may be little danger, if any, of the comb sagging or breaking at any time.

The present invention is designed to facilitate the running of the wires through the holes in the bee-frame, and the tightening of the said wire throughout its entire length. My improvement aims to render it possible to easily and quickly and reliably and uniformly tighten the wire throughout its length, and this practically automatically, that is, without special attention on the part of the operator.

Aside from the broad idea as above outlined, the following are among the salient features of importance now to be specifically described:—

The dumping block and wheel held by a spring so as to have the requisite yielding movement.

The winding-spring-connected crank and spool.

The inter-connection of the extension springs with the dumps so that the tipping of one dump stiffens the inter-connected spring holding another.

The decreasing holding force exerted upon the dump by the extension spring during the tipping movement due to the changing leverage or the high block connection with respect to the dumping pivots.

The decreasing holding force during the same tipping movement due to the turning of the levers and the consequent changing leverage.

The multiplication of the first mentioned holding force by that of the second.

The relative disposition of the levers to accomplish the desired result.

The holding downward and sideways and dropping out of the way of the beveled spring-held frame button when not in use.

The delicate spring adjustment due to the inter-connected springs, and to the possible variation of the spring tension and also of the changing leverage.

The plunger-type spool spin-brake.

The curved ribbon-type spring keeper which prevents slack wire from slipping off the wheel during the threading of the wire.

All of the above will be particularly described as substantially the same, or their equivalent, and are essential to the attainment of the end sought, but it is to be understood that some of the features above outlined may be used in connection with others varying from what is herein shown without departing from the principle involved.

Briefly stated, the running of the wire, in the present instance, consists in leading one end of the wire back and forth around three wheels and through the eight holes, more or less, in the frame, eight in the full sized frame, and through four holes in the smaller frame, and in the latter instance over but one wheel, the tightening labor consisting in turning a crank three or four revolutions, the wheels meanwhile automatically releasing the wire, one portion after another.

The essentials for accomplishing this are the support for the frame to be wired, the spool assembly for attaching and operating the spool of wire, the wire releasing or dumping devices, embodying tiltable blocks, and revolvable wheels, and the spring mechanism for regulating the action of the blocks or dumps, and through them also the tightening of the wire; then the pinching device for pinching the wire while being fastened after being tightened.

The basic member 1, a board or other support, as for instance, a sort of table top, is provided, and upon this the frame to be wired is supported. This frame 2, indicated in Fig. 1, if of full size, as shown, has four holes 3 at each end as shown, if of the smaller size, it has but two holes at each end, and may be held against movement, when being wired, in any suitable manner. In the present instance I have chosen to show a strip 4 secured at one edge of the member 1, as seen in Fig. 1, and to each end of this strip is attached in any suitable manner an angle iron or the like 5, between the members of which one side of the frame is received as shown in Fig. 1. Between the ends of the strip 4 there is disposed a clip or the like 6 which is designed to engage the adjacent side of the frame as seen in Fig. 1, while at the left center where it may be used for full or half depth frames is the metal insert 7. Another insert 8, not needed for small frames, is placed at the upper right. Opposite the board strip 4 there is disposed the member 9 having its under face beveled as seen at 10 in Fig. 7, the said member 9 being revolvable and carried by the vertical pin or the like 11 vertically slidable through the member 1 as seen in Fig. 7, and around this pin below the member 1 is a spring 12 disposed between the underside of the member 1 and a nut or the like 13 on the lower end of the said pin, as seen clearly in Fig. 7. When the frame 2 is placed upon the member 1 with one side engaged by the member 6, its two ends engaged in the angled members 5 and the inserts 7 and 8 and the other side engaged beneath the beveled face 10 of the member 9 the frame is held securely in place, the strain in wiring being in the direction of the length of the member 1 and hence the frame is securely held against displacement. When it is desired to remove the frame all that is first necessary to do is to turn the member 9 on its pin 11, and then the member 9 will drop down out of the way, being urged in that direction by the spring 12 in a manner that will be readily understood. This member 9 may be easily removed to any position as 14, see Fig. 1, for use with half depth frames.

At one end, the member 1 has a recess 15 in which is located a member 16 in the parallel arms 17 of which is mounted the shaft 18, on which, between the members 17, is disposed the spool 19, carrying the wire 20. On the other end of this shaft is the spring 21 attached to said shaft. The other end of this spring is connected as at 22 to the crank 23 rotatably secured on the end of the shaft and provided with an operating handle or the like 24 as seen clearly in Fig. 1. The spool is put on the shaft with the thrust washer 25 against a shoulder of the shaft, the washers 26, the bearing washer 27 being inserted in a hole in the arm 17 of the member 16 as seen in Fig. 1, and then the nut 28 is applied to the threaded end of the shaft and the spool is held firmly to the shaft and within the frame or member 16 all as will be readily understood from Fig. 1.

From the above it is seen that the turning of the crank will, if the end of the spool wire 20 is held, wind the spring 21 and put increasing turning pressure upon the shaft 18 and the spool wire 20. One complete turn of the crank 24 should exert a wire pull of substantially six or seven pounds.

29 is a brake plunger sliding at the front through an arm 17 of the member 16 and at the rear through the washer 30. This plunger is actuated by a spring 31 which with the washer 30 is set in an opening in the member 1, as seen in Fig. 1, said plunger bearing lightly against the adjacent washer 26, and this serves as a retarding pin to retard the spin of the spool in running the wire through the holes in the frame 2, in a manner that will be readily understood.

A pin 32 provided at its upper headed end 33 with an opening just below the head of the pin as seen in Figs. 1 and 3 is freely disposed within the hole 34 in the member 16 and the end of the wire 20 from the spool is run through the said opening of Fig. 1. 35 is a spring surrounding this pin and disposed upon the underside of the member 1, being confined between the said underside of the member 1 and the nut 36 or any suitable provision that may be made. The spring tends to keep the pin held in its lowermost downward limit, pressing the wire upon the member 16. The member 16 projects above the member 1 so that the wire 20 passes through the hole of the pin 32 in a straight line to the adjacent hole in the frame 2. This wire holder allows a free running movement of the wire 20 and yet serves to prevent the free end of the wire from playing around the spool when the wire is cut after the frame has been wired, as will be readily understood.

Referring now to Figs. 1 to 6, it will be noted that the member 1 is provided at one end with two recesses 37 and 38, and at the other end with a recess 39 which latter is disposed relatively mid-way between the recesses 37 and 38 as seen best in Fig. 1. These recesses or slots are all of the same size, and the sides next the frame 2 are cut through the member 1 for the occasional entrance of the wheels 40, 41 and 42, and another purpose to be soon shown, and the other sides are cut partially into the member 1 as at 43, for the proper support of the rear of the blocks 44, 45 and 46 soon to be described.

Attached to the underside of the member 1 in any suitable way are the angle irons 47 in pairs, as seen in Fig. 8, 48 in this instance being the securing means, as screws or the like, the vertical members of these angle irons extending up within the slots as 37, 38, and 39 in the member 1, as seen best in Figs. 6 and 8. These vertical members carry the lateral screw 49 which is run through the block as 44 in which is mounted the vertical pin 50 which carries the wheel 40 mounted for free revolution and provided with a slight tapering groove or channel 51, for a purpose which will soon appear. The screw 49 is the pivotal point for the block 44, and 52 is the high-block connection for a ligament as 66 passing up through the block recess 54. The above is the wheel equipment at the right in Fig. 1 designated as equipment b and at the left in the same figure designated as equipments a and c, it being understood that the angle irons are attached to the underside of member 1.

Adjustably held by the screws 55 through its slotted end and mounted as in Fig. 6 on the rear of block 44 is the curved ribbon-type spring keeper attachment 56 set close to the groove 51 of the wheel 40 so that a slight pressure on the raised projection will permit the wire 20 to enter or leave the groove 51 yet any slack wire will be properly held around the groove 51 during the running and threading of the wire through the holes of the frame 2.

It is understood that this attachment is optional on this machine and may be, or may not be, used.

It will be noticed that pivots of the dump for the blocks and wheels are placed low down on the blocks so as to give the wheels a forward throw during the dump. The wheels are made with a diameter at the bottom of the groove of about three quarters of the distance between the frame wires, as will be seen in Fig. 1, and they are set forward of the pivots far enough to maintain a nearly constant wire lever during all periods of wire release. By this arrangement, the flexible frame wires run easily around the wheels, and under right tension or spring pressure, the wheel blocks can be made to tip successively, so as to release the wire to allow the instantaneous taking up or tightening of the wire by the crank spring. All the parts are so relatively proportioned and disposed as to insure positive and successive actuating thereof, to the end that the wires will be quickly run through the holes in the frame and tightened and then easily fastened in place without unnecessary attention on the part of the operator.

Figs. 3 and 4 show in side view, parts of the equipments a, b, and c. Fig. 2 shows the cross-spring arrangement.

Beneath the member 1 and extending transversely thereof as seen in Figs. 2 and 3, are the members 57 properly spaced apart as shown, the one on the left having therein two grooves 58 and that on the right having one groove 59, the latter being disposed along the median line of member 1 and the others upon each side of such line.

60 is a lever pivoted at 61 to the member 53 attached to the side of the member 57 adjacent one of the grooves 58 and beneath the recess 37 of the equipment a, while adjacent the groove 59 and beneath the recess 39 of the equipment b is pivoted another lever 62 upon a pivot 63. 64 is a similar lever pivoted at 65 adjacent the groove 58 beneath the recess 38 of the equipment c.

66 is a wire or other ligament connected at one end to an extremity of the lever 60 and at the other end to the block 44 of the equipment a at a point 52 behind and above the pivot of the latter. 67 and 68 are similar ligaments connected at their one ends to similar levers 62 and 64 respectively, and at their other ends to the equipments b and c respectively.

A ligament embodying the spring 69 is attached at one end to an extremity of the lever 60 and at its other end is attached to an end of the lever 62 at the point of connection 70 of the ligament of the spring 71 with such lever. The ligament of the spring 71 has its other end attached to the lever 64 at the point of connection 72 of the ligament of the spring 73. The other end of the spring 73 is attached through its ligament to the threaded member 74 adjustably held in a member 57 by the thumb nut 75.

The blocks 44, 45 and 46 of the drum equipment $a$, $b$, and $c$, as seen in Figs. 2, 3, 4 and 6, are each provided with a recess 54 above referred to, providing for the sway of the various ligaments 66, 67 and 68 toward or from the pivots during the tipping movements of the dumps. It will be seen from Figs. 3 and 4 that the moving of the ligaments 66, 67 and 68 nearer the pivots 49 puts a decreasing leverage from such ligaments upon the blocks. Similarly in Figs. 2, 3 and 4 it is seen that the turning of the levers 60, 62 and 64 during the dumping motions greatly decreases the leverage of the springs 69, 71 and 73 upon such levers, both by reason of the leverage of the spring connections moving nearer the pivots 61, 63 and 65, and by reason of the leverage of the ligament connections 66, 67 and 68 to these levers moving out from the pivots 61, 63 and 65. And it is further observed that the decreasing leverage upon the blocks 44, 45 and 46 due to the movement leverage of the holding ligaments 66, 67 and 68 toward the pivots of such blocks is multiplied by the decreasing leverage of the springs produced upon the same holding ligaments by the turning of the levers 60, 62 and 64.

This fast decreasing leverage or holding force of the extension springs gives a necessary starting impetus to the crank spring moving several portions of wire round the wheels of the device and through the holes in the bee-frame, and accomplishes a simple tightening operation as much by the shock of a suddenly halted momentum as by a straight-forward spring pressure.

The connection and arrangements of parts in Fig. 2 is also such that the tipping of dump $a$, by increasing the tension of the spring 69, helps to prevent dump $b$, nearer the winding spool, from dumping; likewise the dumping of dump $b$, through the spring 71 helps to retain dump $c$. These interconnected spring relations, together with a possible variation of the spring tension by a shortening or a lengthening of the connecting ligaments and together with a possible variation of the angularity of the ligament connections upon the levers with relation to the pivots to the latter, as by a shortening or a lengthening of the ligaments 66, 67 and 68 give a very nice adjustment for all dumps. The spring 69 regulates the tension for dump equipment $a$, the spring 71 regulates the tension for dump $b$, and the spring 73 adjusts the tension for dump $c$.

The operation will be readily understood from the foregoing description when taken in connection with the drawing, and, briefly stated, is as follows:—The operator secures the frame in position on the member 1 in the manner indicated, and places tacks; he then grasps the free end of the wire 20 and draws it around the wheels of the equipments $a$, $b$ and $c$ and through the holes in the opposite sides of the frame and then fastens it to a tack as at 76, Fig. 1; he then grasps the crank 24 with one hand, meanwhile steadying the member 1 with the other hand, thumb resting on the dump $c$, and turns the crank. The spool first takes up the slack in the wire 20; then after the crank spring is wound sufficiently, the dump $a$ suddenly tips, moving on its pivot, and as the wire slips off its wheel, the crank spring pulls up the wire. As the crank continued to turn and the spool to revolve the block and wheel of the dump $b$ quickly tip and the wire is again automatically drawn up as before. The operator then removes his thumb from the tail of the dump $c$; it dumps quickly with the turning of the crank, and the spool winding spring 21 whirls the last wire tight. The crank is now backed off a half turn, the wire fastened and cut, the last tack is driven, and the frame removed.

As used above the dump $c$ is adjusted for a wire tension slightly less than that of the dump $b$. This is most satisfactory for fast work with the pincher; however, the dump $c$ may be adjusted so that it is not held by the thumb at all, but tips of itself at the right time. Thus the whole wire is tightened with one hand by simply giving the crank three or four turns.

In Figures 6 and 8 the dump consists of a wheel placed upon a pivotally mounted block 44. Normally this wheel and block, or dump, are held in a horizontal position by the spring as 69 in Figure 3. If, however, I loop a wire around the wheel and pull upon the ends hard enough the dump will move upon its pivot 49, Figure 8 toward a vertical position until the wire slips off the wheel or is released from the wheel. Now, assume that I have three dumps as placed in Figure 1, with a wire run back and forth over the wheels and fastened at one end; then as I pull upon the other end assume that the springs are adjusted progressively weaker toward the secured end of the wire, that is, from $c$ to $b$ to $a$, such that when I give a sudden pull upon the wire the dumps $a$, and $b$ and $c$ dump, successively in alphabetical order and release the wire from the wheels. Of course, in my device the operator's pull upon the wire is through the medium of the crank, crank spring and spool. Between the successive and progressive releases of the wire there must be intervals for tightening the wire, $a$ to $b$ to $c$, by the crank spring in order to produce further dumping. Hence, after the wheel a releases, turning the crank tightens the wire until the wheel b releases; further cranking tightens the wire till the wheel c releases the wire. These successive releases and drawing of the wire taut take place rapidly in about three turns of the crank.

In using the keeper 56 the wire is looped around the wheels as though no attachment existed. The act of pulling on the wire automatically places the wire down in the groove 51 so that slack wire is held while it is threaded through the holes of the frame.

In conjunction with my bee-hive wiring device as already described, I generally employ (although this may be omitted) an attachment for pinching the wire against the side of the frame and holding it tight, so that the operator can easily and quickly twist the same around the tack; this has reference to the last-tightened wire. Such an attachment, which may be readily applied to the member 1, is seen in Figs. 1 and 5, to which reference is now made.

In these figures, 77 is a lever pivoted at 78 on the side of the member 1, and having attached thereto one end of a wire or the like 79, the said wire 79 passing under the double grooved pulley 80 carried by the bracket or the like 81 secured to one of the members 57 beneath the member 1, as seen in Fig. 5, the other end of this wire 79 being attached as at 82 to one end of the member 83 pivoted at 84 within a recess in the member 1. To the opposite end of the lever 83 and equi-distant from the pivot 84 a ligament 85 is attached and passed around the other side of pulley 80 is a second groove, and is connected to one end of the spring 86 projecting through an opening in the member 57. The other end of the spring 86 is attached to a member 87 secured to the side of the member 57 all as clearly seen in Fig. 5. The right hand end of the member 83 is shown as with a thickened portion which at the extremity has striations or the like 88 for better gripping the wire. Normally the pincher 83 is flush with the upper face of the member 1 as seen in full lines in Fig. 5, and is of such length that it may rise to a point about one-fourth inch above the adjacent hole in frame 2.

In position, as shown the pincher attachment is of course inoperative. In use, after the spool has whirled the last wire tight, the operator with the one hand raises the lever 77 thus bringing the pincher member 83 into the vertical position in which it is shown in Fig. 5, lifting the last tightened wire as seen in dotted lines in said Fig. 5; meanwhile, though the crank spring is held partly wound, the spool unwinds a little to permit of the change of position of the wire to the dotted line position in Fig. 5, then with the other hand the operator after having backed off the crank a half turn as before mentioned, twists the wire round the last tack drives the tack and cuts the wire; the frame then being ready to be removed.

Attention is here directed to the fact that the running and tightening of the wires in this device may proceed with the use of only two dumps, the dump lettered a in Figure 1 with its holding parts including the lever 60 and the spring 69 in Figure 2 being omitted. This use of the machine with two dumps instead of three does not in any way alter or impair the constructive novelties of the device, the operation in all respects being substantially the same.

From the foregoing the successive dumping of the dumps, the successive releasing of the wire, and the successive drawing of the same taut will be readily understood.

It is to be understood that the device may be used either with or without the pinching device just described.

From the above it will be seen that I have devised a simple, efficient and reliable device for the purpose stated, and which is capable of operation by an inexperienced operator, requiring but the minimum amount of attention on his part, and while the structural embodiment of the invention as herein disclosed is what I at the present time consider most desirable it is evident that the same is subject to changes, variations and modifications in detail, construction and arrangement of parts without departing from the spirit of the invention or sacrificing any of its advantages. I therefore do not intend to restrict myself to the precise construction herein set forth, but reserve the right to make such changes as may come within the scope of the appended claims.

What I claim as new is:—

1. In a device for applying wire to a frame comprising spaced apart, opposing bars perforated at intervals for the passage of the wire, the combination of wire guide means over which the wire passes, situated to contact with portions of the wire that extend in opposite directions and through perforations in said bars, means that effect the disengagement of the wire from said guide means, and means to exert longitudinal pull on the wire when the guide means engaging portion is disengaged therefrom, to take up the slack in the wire resulting from such disengagement.

2. In a device for applying wire to a frame comprising spaced apart, opposing bars perforated at intervals for the passage of the wire, the combination of wire guide means over which the wire passes, situated to contact with portions of the wire that extend in opposite directions and through perforations in said bars, means that effect the disengagement of the wire from said guide means, and means to exert longitudinal pull on the wire when the guide means engaging portion is disengaged therefrom, to take up the slack in the wire resulting from such disengagement, said guide means comprising a convexly curved surface.

3. A device as in claim 1 in which the guide means is movable to effect the wire disengagement.

4. A device as in claim 1 in which the guide means is a wheel supported for movement in a direction to effect disengagement of the wire therefrom.

5. A device as in claim 1 in which the longitudinal pull on the wire is exerted before and after wire disengagement is effected, and the means for effecting wire disengagement acting when a predetermined tension is exerted on the wire.

6. In a device for wiring a frame comprising spaced apart, opposing bars having perforations at intervals for the passage of the wire, the combination of spaced apart wire guides, means to hold a frame in the space between said wire guides with the perforated bars towards the guides, means to effect disengagement of the wire from the guides, and means to exert pull on the wire acting to take up slack in the wire resulting from such disengagement.

7. In a device for wiring a frame comprising spaced apart, opposing bars having perforations at intervals for the passage of the wire, the combination of spaced apart wire guides, means to hold a frame in the space between said wire guides with the perforated bars towards the guides, means to effect disengagement of the wire from the guides in succession, and means to exert pull on the wire acting to take up slack in the wire resulting from such disengagement.

8. In a device for wiring a frame comprising spaced apart, opposing bars having perforations at intervals for the passage of the wire, the combination of spaced apart movably supported wire guides, means to hold a frame in the space between said wire guides with the perforated bars towards the guides, means to move said guides to effect disengagement of the wire from the guides in succession, and means to exert pull on the wire acting to take up slack in the wire resulting from such disengagement.

9. In a device for wiring a frame comprising spaced apart, opposing bars having perforations at intervals for the passage of the wire, the combination of a support for the frame, wire guide means adjacent the position of one of said bars when on the frame support, means to subject the wire to longitudinal pull, and means to effect disengagement of the wire from said guide means.

10. In a device for wiring a frame comprising spaced apart, opposing bars having perforations at intervals for the passage of the wire, the combination of a support for the frame, wire guide means adjacent the position of one of said bars when on the frame support, means to subject the wire to longitudinal pull, and means to effect disengagement of the wire from said guide means acting when a predetermined tension is exerted by the wire pulling means.

11. In a wiring device for frames having spaced apart, opposing bars perforated at intervals for the passage of wire, a support for such a frame, a plurality of spaced apart wire guides, movable supports for the latter, tension-producing connections to such supports, and means to exert longitudinal pull on the wire, said guide supports moving to disengage the wire therefrom when the wire is subjected to a predetermined pull.

12. In a wiring device for frames having spaced apart, opposing bars perforated at intervals for the passage of wire, a support for such a frame, a plurality of spaced apart wire guides, movable supports for the latter, elastic connections between such supports, and means to exert longitudinal pull on the wire, said guide supports moving to disengage the wire therefrom when the wire is subjected to a predetermined pull.

13. In a wiring device for frames having spaced apart, opposing bars perforated at intervals for the passage of wire, a support for such a frame, a plurality of spaced apart wire guides, movable supports for the latter, yieldable connections between such supports for transmitting motion from one to another thereof, and means to exert longitudinal pull on the wire, said guide supports moving to disengage the wire therefrom when the wire is subjected to a predetermined pull.

14. In a wiring device for frames having spaced apart, opposing bars perforated at intervals for the passage of wire, a support for such a frame, a plurality of spaced apart wire guides, movable supports for the latter, yieldable connections between such supports for transmitting motion from one to another thereof comprising levers connected with the respective supports and springs connected with the levers, and means to exert longitudinal pull on the wire, said guide supports moving to disengage the wire therefrom when the wire is subjected to a predetermined pull.

15. In a wiring device for frames having spaced apart, opposing bars perforated at intervals for the pasage of wire, a support for such a frame, a plurality of spaced apart wire guides, pivoted supports for the guides, levers connected to the supports, connections between the levers to impart motion from one to another, and means to exert longitudinal pull on the wire.

16. In a wiring device for frames having spaced apart, opposing bars perforated at intervals for the passage of wire, a support for such a frame, a wire guide, of wheel form, and a pivotal support for said guide having a center of motion to one side of the plane of the wire engaging surface of the wheel and excentric to the wheel.

17. In a device for applying wire to a frame comprising spaced apart, opposing bars perforated at intervals for the passage of the wire, the combination of wire guide means over which the wire passes, situated to contact with portions of the wire that extend in opposite directions and through perforations in said bars, means that effect the disengagement of the wire from said guide means, and spring means to exert longitudinal pull on the wire when the guide means engaging portion is disengaged therefrom to take up the slack in the wire resulting from such disengagement.

18. In a device for applying wire to a frame comprising spaced apart, opposing bars perforated at intervals for the passage of the wire, the combination of wire guide means over which the wire passes, situated to contact with portions of the wire that extend in opposite directions and through perforations in said bars, means that effect the disengagement of the wire from said guide means, and means to exert longitudinal pull on the wire when the guide means engaging portion is disengaged therefrom to take up the slack in the wire resulting from such disengagement, comprising a spool, a hand rotating device and a coil spring interposed between the spool and said device placed under tension by the rotation of said device.

19. In a wiring device for frames having spaced apart, opposing bars perforated at intervals for the passage of wire, a support for such a frame, a plurality of spaced apart wire guides, movable supports for the latter, yieldable connections between such supports for transmitting motion from one to another thereof, and spring means to exert longitudinal pull on the wire, said guide supports moving to disengage the wire therefrom when the wire is subjected to a predetermined pull.

20. In a device for applying wire to a frame comprising spaced apart, opposing bars perforated at intervals for the passage of wire, the combination of wire guide means over which the wire passes, and from which it is disengageable, said means situated to contact with portions of the wire that extend in opposite directions through perforations in said bars, and quickly acting spring means to exert longitudinal pull on the wire when disengaged from said guide means to take up slack in the wire resulting from such disengagement.

21. In a device for applying wires to a frame having spaced apart, opposing bars perforated at intervals for the passage of the wire, the combination of wire guide means situated to contact with portions of the wire that extend in opposite directions, and through perforations in said bars, wire pulling means, and a movably mounted wire-engaging device, situated to engage and temporarily hold the wire at a point adjacent the wire end that is to be permanently secured to the frame.

22. In a device for applying wires to a frame having spaced apart, opposing bars perforated at intervals for the passage of the wire, the combination of wire guide means situated to contact with portions of the wire that extend in opposite directions, and through perforations in said bars, wire pulling means, a lever having a wire-engaging end situated to pinch the wire against a relatively stationary surface adjacent the point where the wire end is to be permanently secured to the frame, and means to actuate said lever.

23. The combination of wire guide means, wire pulling means, a base for said parts and for a frame to be wired, and means to hold said frame on the base comprising a beveled faced button, a rotatable and longitudinally movable shaft for the button, and a spring on the shaft exerting pressure thereon to hold the button in frame engagement.

In testimony whereof I affix my signature.

WILLIAM E. LYMAN.